Patented Dec. 8, 1936

2,063,073

UNITED STATES PATENT OFFICE 2,063,073

AQUEOUS DISPERSIONS OF HYDROGENATED RUBBER AND PROCESS OF PREPARING THE SAME

Alfonso M. Alvarado, Wilmington, Del., assignor to E. I. du Pont de Nemours & Company, Wilmington, Del., a corporation of Delaware No Drawing. Application December 13, 1934, Serial No. 757,309

13 Claims. (Cl. 134—17)

This invention relates to the art of dispersions. More particularly it relates to dispersions of hydrogenated rubber of the oil-in-water type, and to the use of these dispersions in the coating and impregnating arts.

It is an object of this invention to prepare aqueous dispersions of hydrogenated rubber. A further object is the preparation of aqueous dispersions of hydrogenated rubber which are free of organic solvents. A still further object is the use of these aqueous dispersions of hydrogenated rubber in the coating and impregnating arts. Other and further objects of this invention will appear as the description proceeds.

In view of the fact that heat coagulates natural rubber latex, it is not feasible to prepare hydrogenated rubber dispersions by direct hydrogenation of natural rubber latex.

I, therefore, accomplish the objects of my invention by a process comprising the steps of mechanically working a dispersing agent and a protective colloid into the hydrogenated rubber, and then reducing the rubber paste thus formed with water to the desired solids content.

As dispersing agent, I prefer to use a salt of a higher fatty acid, for instance common soap or salts of ammonia or organic amines and higher fatty acids such as occur in animal fat, Chinawood oil, castor oil, soya bean oil and the like. These soaps or salts may be used as such, or they may be synthesized from their constituents in the process of preparing the dispersion, since this process generally involves the use of elevated temperatures.

As protective colloid, any of the organic substances commonly known to have this property may be employed, for instance triethanolamine, casein, glue, gelatin, gum arabic, and the like.

The incorporation of the above agents into the hydrogenated rubber is best effected in an internal type mixer, like the Banbury mill, provided with means for heating the rotors. According to one mode of carrying out my invention, I mix the hydrogenated rubber, the higher fatty acid, for instance oleic acid, and the protective colloid, for instance triethanolamine, in the Banbury mill, and work the mixture for about 30 minutes at about 200° F. I then add potassium hydroxide solution, in about 10% excess over the amount required to react with the oleic acid, at suitable intervals, while continuously masticating the rubber mix. I follow this up with concentrated ammonium hydroxide solution, at convenient intervals, until the dispersion is converted from the water-in-oil type to the oil-in-water type. In order to prevent loss of ammonia, I generally prefer to carry out the latter operation with the mill sealed. Upon completion of the addition of the ammonium hydroxide, I reduce the dispersion in the mill with water to the desired total solids content.

These procedural steps, however, are not critical, and may be varied within wide limits. Firstly, as already mentioned, I may employ a finished soap instead of the corresponding acid and alkali as individual constituents. Secondly, I may mix the dispersing agent and hydrogenated rubber in liquid phase, for instance by employing the hydrogenated rubber in solution. Thus, I may dissolve the hydrogenated rubber in a suitable organic solvent, such as toluol, add a small amount of oleic acid thereto, place under a high-speed stirrer, and add slowly while continuously agitating an aqueous solution of potassium hydroxide.

If desired other ingredients and assistants may be incorporated into the dispersion during the same process, for instance cellulose esters or ethers, pigments, fillers, resins, and other modifying agents, depending on the objects and intended properties of the resulting dispersion.

The hydrogenated rubber used in this invention may be prepared according to copending application of Flint, Serial No. 705,399, or according to any other known process. It may be completely hydrogenated or only partially so. In Example 1 of said copending application, a procedure is disclosed whereby hydrogenated rubber of from 62% to substantially complete hydrogenation may be prepared.

Without limiting my invention to any particular procedure, the following examples are given to illustrate a few of the preferred embodiments of my invention. Parts mentioned are by weight.

*Example 1*

|  | Parts |
|---|---|
| Hydrogenated rubber (Iodine No. 3.5) | 300 |
| Oleic acid (acid No. 189) | 30 |
| Triethanolamine | 15 |
| Aqueous potassium hydroxide solution (4.76%) | 126 |
| Ammonium hydroxide (28–29% ammonia) | 25 |
| Water | 254 |
| Total | 750 |

The hydrogenated rubber, oleic acid, and triethanolamine are mixed in a Banbury mill and the mixture is kneaded at about 200° F. for 30 minutes, at the end of which time the aqueous potassium hydroxide solution is added at five-minute intervals over a period of 35 minutes.

Following the addition of the potassium hydroxide solution, the concentrated ammonium hydroxide (28-29% ammonia) is added, the head placed on the mill, and the batch kneaded for 19 minutes, and then gradually reduced in the mill with the water. The product obtained contains 40% rubber solids, and is a thin dispersion which shows but slight tendency to settle out upon standing overnight. Wool felt impregnated with the above dispersion reduced to 20% solids with water shows excellent water-resistance and aging qualities.

Example II

Three hundred parts of hydrogenated rubber (iodine No. 3.5) and 34 parts of potassium oleate are mixed in a rubber mill or calender; the mixture is transferred to a Werner-Pfleiderer mixer, and treated with 50 parts of concentrated ammonium hydroxide (28-29% ammonia), the ammonium hydroxide being added at 19-minute intervals over a period of 38 minutes. To the paste in the mill is then added 15 parts of fish glue; and the mass is reduced with 351 parts of water. The dispersion obtained contains 40% rubber solids and is free from all evidences of lumpiness.

Example III

| | Parts |
|---|---|
| Hydrogenated rubber (iodine No. 15) | 450 |
| Glue (fish) | 25 |
| Potassium stearate | 40 |
| Ammonium hydroxide (28-29% ammonia) | 50 |
| Water | 185 |
| Total | 750 |

The hydrogenated rubber and glue are masticated cold in the Banbury mill for 15 minutes. The potassium stearate is then added, and the mixture further milled for 25 minutes with the rotors heated to 200° F. by means of circulating hot water. To this mix is then added the concentrated ammonium hydroxide in two equal portions at 19-minute intervals, the head being placed on the mill following each addition. The water is then added and milling is continued until the suspension is uniform.

Example IV

Solution A

| | Parts |
|---|---|
| Ethyl cellulose | 30.0 |
| Toluol | 144.5 |
| Ethyl alcohol | 25.5 |
| Total | 200.0 |

The above mixture is stirred together until the ethyl cellulose has completely dissolved.

Solution B

| | Parts |
|---|---|
| Water | 94 |
| Sodium petroleum sulfonate | 3 |
| Glue (fish) | 3 |
| Total | 100 |

Solution B is slowly added to Solution A with continuous, vigorous agitation, to form a dispersion of ethyl cellulose.

To 200 grams of the 10% ethyl cellulose dispersion prepared above is added slowly, with stirring, 50 parts of the hydrogenated rubber dispersion prepared in Example I. The ratio of ethyl cellulose to hydrogenated rubber in the resulting mixed dispersion was 1:1.

Dispersions prepared as above may be used for coating fabric or metal surfaces for various purposes, in the same manner as dispersions of ordinary rubber or natural rubber latex may be employed. The dispersions directly obtainable according to the above examples are tacky, and may be used for their adhesive action. They may, however, be rendered tack-free by the use of waxes, pigments, or fillers, such as chalk, gypsum, soapstone, mica, and the like.

The tacky coated fabrics are admirably suited for use as adhesive tape, or electrical insulation tape, whereas the non-tacky coated fabrics can be used as material for shower curtains, window shades, and washable table cloths. Fabrics coated in this manner have been found free from stiffening effects or other failures after 6 months aging at 65° C. The non-tacky compositions may also be used as protective agents for metal or wood surfaces which are subject to decomposition through oxidation.

The processes set forth in the above examples for the preparation of the dispersions of this invention are capable of considerable variation in procedural steps as well as with reference to the type of equipment that may be used.

Generally, it is preferable to prepare these dispersions without the use of an organic solvent because this increases the cost, and increases also the viscosity of the dispersion for a given concentration of rubber. Dispersions containing an organic solvent may be made either in a colloid mill or with the aid of a high-speed stirrer.

It is generally advantageous to form the dispersing agents in situ in the Banbury mill, by reacting a higher fatty acid with an aqueous solution of an alkali, but if desired the dispersing agent may be synthesized separately and incorporated into the hydrogenated rubber by suitable mastication or by means of a solvent. In lieu of the oleic acid of the above examples, other higher fatty acids may be used, for instance stearic acid, lauric acid, linseed oil acids, China-wood oil acids, castor oil acids, soya bean oil acids, etc. In lieu of the potassium hydroxide of the examples other suitable alkalis may be used, including sodium hydroxide, ammonium hydroxide, mono- and dicycloheranolamines, etc., but it is generally advantageous to use potassium hydroxide, because the potassium soaps of the higher fatty acids are softer and more soluble than the corresponding sodium soaps. The use of a protective colloid generally leads to an improvement in the stability of the dispersion. In lieu of the glue in the above examples, one may use casein, gum arabic, starch, Irish moss, gum tragacanth, Russian isinglass, gelatin, etc. It will be noted that these are all protective colloids of the hydrophile type; that is they are soluble in water.

The proportion of dispersing agent may vary up to about 20% on the weight of the rubber, and the weight of protective colloid up to about 10% on the weight of the rubber. The concentration of the dispersions made in accordance with the processes of this invention may be varied up to 70-80%, and such highly concentrated dispersions show unusual stability against creaming upon aging.

With reference to Example IV, I wish to point out that coatings of mixtures of hydrogenated rubber and cellulose derivatives may be of two types: (1) a dull finish coating comprising only the mixture of the hydrogenated rubber latex and the dispersion of the cellulose derivative, and (2) a glossy finish coating comprising a mixture of the hydrogenated rubber latex with the cellulose derivative and a blending softener or plasticizer which is usually soluble in both the hydrogenated rubber and cellulose derivative.

Softeners of the above type which are suitable for mixtures of hydrogenated rubber and such cellulose derivatives as nitrocellulose, ethyl cellulose and benzyl cellulose are dibutyl phthalate, dibutyl adipate, diamyl succinate, dicyclohexyl phthalate, cyclohexyl butyl adipate, butyl benzoylbenzoate, and dibutyl stearamide. For mixtures of hydrogenated rubber and cellulose esters such as cellulose acetate, cellulose propionate, and cellulose butyrate, the chlorinated hydrocarbons such as chlorinated diphenyls and chlorinated naphthalenes containing 45-65% combined chlorine by weight are satisfactory.

Coatings of the first type, though not so strong, are useful especially where a dull finish coat is desired or where strength of the coating is immaterial to the quality of the coated fabric. Coatings of the second type are applicable for general use inasmuch as they are quite strong.

Other cellulose derivatives that may be blended with hydrogenated rubber include crotonyl cellulose, cellulose propionate, cellulose nitrate, cellulose butyrate, benzyl cellulose, cellulose nitroacetate, cellulose acetopropionate, etc. It will be noted that these cellulose derivatives all possess the property of being thermoplastic; that is, they soften with heat. In addition to the plasticizers and blending softeners mentioned above, many others may be used, for instance the aryl phosphates, diamyl phthalate, or other alkyl phthalates, aryl phthalates, and alicyclic phthalates such as dicyclohexyl phthalate, alkyl and aryl succinates and adipates such as dibutyl adipate and dibenzyl succinate, etc., dibutyl stearamide, and butyl benzoylbenzoate.

Pigments such as lithopone, graphite, lamp black, iron oxide, zinc oxide, white lead, titanium dioxide, and Prussian blue; natural resins or gums such as Congo, dammar, kauri, rosin, ester gum, asphalt, and the like; synthetic resins such as certain of the phenol-formaldehyde resins, certain of the polyhydric alcohol-polybasic acid resins, certain of the vinyl type resins, and the like, particularly those of a strong hydrocarbon nature, may be incorporated either into the unmodified hydrogenated rubber dispersions or into the hydrogenated rubber dispersions modified with cellulose derivatives. The modifying agents enumerated above may either be blended with the hydrogenated rubber prior to dispersion, or they may be separately dispersed and blended with the hydrogenated rubber dispersion.

Rubber in varying degrees of hydrogenation may be used, but best results are obtained by the use of completely hydrogenated rubber, because of its superior aging qualities.

The temperature employed in the Banbury mill may vary within reasonable limits. Of course, it is necessary to heat high enough to render the rubber plastic, but at the same time temperatures which would make the added water boil are wasteful. A practical range is from about 170 to 212° F.

Numerous other variations and modifications are possible in my invention as above disclosed, without departing from the spirit thereof.

Dispersions of hydrogenated rubber made in accordance with this invention have finer particle size than natural rubber latex.

For a given concentration, dispersions prepared in accordance with this invention have a lower viscosity than cements prepared by dissolving natural rubber in organic solvents and this lower viscosity makes it possible to apply these aqueous dispersions much more easily, because of better flow, than rubber cements of corresponding concentration. Cements containing more than 10-15% of rubber are generally impractical for use in coating operations because of poor flow, but aqueous dispersions prepared in accordance with the processes of this invention containing 40-50% of hydrogenated rubber, because of their relatively low viscosity, are entirely practical because they can be applied to cloth, coated fabrics, wood, steel, etc., by ordinary coating processes. Again, the fire hazard incident to the use of rubber cements is entirely eliminated by the employment of my aqueous dispersions. Other advantages include economy in manufacture and in use through elimination of expensive organic solvents, and the necessity for the application of fewer coats for a given film thickness than with the rubber cements commonly employed.

I claim:

1. A composition of matter comprising hydrogenated rubber and a thermoplastic cellulose derivative stably dispersed in an aqueous medium, said composition being resistant to degradative oxidation by air.

2. A composition of matter comprising a suspension of hydrogenated rubber of an iodine number not exceeding 15, a dispersing agent, and a protective colloid in an aqueous medium, said composition being resistant to degradative oxidation by air.

3. A composition of matter comprising an aqueous dispersion of hydrogenated rubber having an iodine number of about 3.5 to 15, potassium oleate and a protective colloid selected from the group consisting of triethanolamine, casein, glue, gelatin, gum arabic, and starch.

4. The method of preparing an aqueous dispersion of hydrogenated rubber which comprises admixing therewith a small amount of dispersing agent while masticating, adding slowly thereto a protective colloid, thoroughly masticating the mixture, then adding aqueous ammonia until the hydrogenated rubber is thoroughly incorporated into the dispersing medium, and then reducing with water to the desired solids content.

5. Fabric coated with a composition as defined in claim 1.

6. Fabric coated with a composition as defined in claim 3.

7. A composition of matter comprising a suspension of hydrogenated rubber having an iodine number not greater than 15, a dispersing agent, and a protective colloid in an aqueous medium, the proportion of dispersing agent being not over 20%, and the proportion of protective colloid being not over 10%, by weight as compared to the weight of the rubber.

8. The process of forming an aqueous dispersion of hydrogenated rubber, which comprises milling hydrogenated rubber, at a temperature between 170 and 212° F., with a dispersing agent, and then diluting with water under agitation until a uniform dispersion has been obtained.

9. The process of forming an aqueous dispersion of hydrogenated rubber, which comprises milling hydrogenated rubber, at a temperature between 170 and 212° F., with a dispersing agent selected from the group consisting of salts of higher fatty acids, and then diluting with water under agitation until a uniform dispersion has been obtained.

10. The process of forming an aqueous dispersion of hydrogenated rubber, which comprises milling hydrogenated rubber, at a temperature between 170 and 212° F. with a higher fatty acid in the presence of a tertiary organic base, adding aqueous alkali, and diluting the mass gradually with water while mechanically kneading the same, until a uniform stable dispersion of the desired solids content is obtained.

11. A process as in claim 10, the inorganic alkali being used in sufficient excess to give the resulting dispersion an alkaline reaction.

12. An aqueous emulsion of hydrogenated rubber of high stability, and being substantially identical with the composition obtainable by the process defined in claim 4.

13. An aqueous emulsion of hydrogenated rubber of high stability, and being substantially identical with the composition obtainable by the process defined in claim 8.

ALFONSO M. ALVARADO.